(12) United States Patent
Tang et al.

(10) Patent No.: US 10,966,205 B2
(45) Date of Patent: Mar. 30, 2021

(54) COMMUNICATION METHOD, AND COMMUNICATIONS APPARATUS AND SYSTEM

(71) Applicant: Huawei Technologies Co., Ltd., Guangdong (CN)

(72) Inventors: Xun Tang, Beijing (CN); Li Chai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/382,879

(22) Filed: Apr. 12, 2019

(65) Prior Publication Data

US 2019/0239207 A1 Aug. 1, 2019

Related U.S. Application Data

(63) Continuation of application No. PCT/CN2017/105683, filed on Oct. 11, 2017.

(30) Foreign Application Priority Data

Oct. 13, 2016 (CN) .......................... 201610895666.7

(51) Int. Cl.
*H04W 72/04* (2009.01)
*H04W 24/10* (2009.01)
(Continued)

(52) U.S. Cl.
CPC ........ *H04W 72/046* (2013.01); *H04B 7/0408* (2013.01); *H04B 7/0617* (2013.01);
(Continued)

(58) Field of Classification Search
None
See application file for complete search history.

(56) References Cited

U.S. PATENT DOCUMENTS 9,596,053 B1\* 3/2017 Marupaduga ......... H04L 1/0015
10,477,591 B2\* 11/2019 Jung ................. H04W 74/0833
(Continued)

FOREIGN PATENT DOCUMENTS

CN 103220740 A 7/2013
CN 103228053 A 7/2013
(Continued)

OTHER PUBLICATIONS

3GPP TSG-RAN WG2 Meeting #95 bis, R2-166108, MediaTek Inc.:"RLM and RLF in HF NR", Kaohsiung, Taiwan, Oct. 10-14, 2016, total 4 pages. XP51150726.
(Continued)

*Primary Examiner* — Anh Vu H Ly
(74) *Attorney, Agent, or Firm* — Kilpatrick Townsend & Stockton LLP

(57) ABSTRACT

Embodiments of the present disclosure provide a communication method, and a communications apparatus and system. User equipment can communicate with the network device by using a plurality of beams, the plurality of beams include a first beam and at least one second beam, the first beam is a serving beam used by the user equipment to listen to control information, and the second beam is a beam other than the serving beam. The method includes: determining, by the user equipment, that the serving beam is blocked; and obtaining, by the user equipment, a first message from the network device by using the first beam or the second beam. According to the method, the UE may determine that the serving beam is blocked, and further obtain the first message sent by the network device, thereby eliminating an adverse effect caused by the blocking of the serving beam. Correspondingly, the network device may also determine that the serving beam is blocked, and further send the first message,
(Continued)

thereby eliminating an adverse effect caused by the blocking of the serving beam.

16 Claims, 8 Drawing Sheets

(51) Int. Cl.

| | |
|---|---|
| H04W 36/16 | (2009.01) |
| H04W 16/28 | (2009.01) |
| H04W 36/00 | (2009.01) |
| H04W 24/04 | (2009.01) |
| H04B 7/06 | (2006.01) |
| H04B 7/0408 | (2017.01) |
| H04W 72/12 | (2009.01) |
| H04W 74/08 | (2009.01) |
| H04W 88/02 | (2009.01) |

(52) U.S. Cl.
CPC ........... *H04W 16/28* (2013.01); *H04W 24/04* (2013.01); *H04W 24/10* (2013.01); *H04W 36/00* (2013.01); *H04W 36/16* (2013.01); *H04W 72/042* (2013.01); *H04W 72/1268* (2013.01); *H04W 74/0833* (2013.01); *H04W 88/023* (2013.01)

(56) References Cited

U.S. PATENT DOCUMENTS

| 10,517,009 | B2* | 12/2019 | Zetterberg | H04W 24/10 |
|---|---|---|---|---|
| 2012/0052828 | A1* | 3/2012 | Kamel | H04B 17/104 |
| | | | | 455/226.2 |
| 2013/0039345 | A1 | 2/2013 | Kim et al. | |
| 2016/0119770 | A1* | 4/2016 | Ryu | H04W 76/14 |
| | | | | 370/328 |
| 2016/0150591 | A1 | 5/2016 | Tarighat Mehrabani et al. | |
| 2016/0353510 | A1* | 12/2016 | Zhang | H04B 7/0695 |
| 2017/0223552 | A1 | 8/2017 | Roy et al. | |
| 2017/0265111 | A1* | 9/2017 | Fan | H04B 7/0617 |
| 2017/0280365 | A1 | 9/2017 | Wang et al. | |
| 2017/0295502 | A1* | 10/2017 | Stirling-Gallacher | H04B 7/024 |
| 2017/0295508 | A1* | 10/2017 | Stirling-Gallacher | H04L 5/0048 |
| 2018/0049137 | A1* | 2/2018 | Li | H04B 17/309 |
| 2019/0140549 | A1* | 5/2019 | Lindemann | H02M 1/08 |
| 2019/0199412 | A1* | 6/2019 | Koskela | H04B 7/0417 |
| 2019/0222279 | A1* | 7/2019 | Xi | H04W 72/00 |
| 2020/0021350 | A1* | 1/2020 | Koskela | H04B 7/0639 |

FOREIGN PATENT DOCUMENTS

| CN | 103875191 A | 6/2014 |
|---|---|---|
| CN | 103988551 A | 8/2014 |
| CN | 105052199 A | 11/2015 |
| CN | 105682111 A | 6/2016 |
| CN | 105790886 A | 7/2016 |
| WO | 2015029604 A1 | 3/2015 |
| WO | 2016086144 A1 | 6/2016 |
| WO | 2016095688 A1 | 6/2016 |
| WO | 2016116879 A1 | 7/2016 |
| WO | 2016127403 A1 | 8/2016 |

OTHER PUBLICATIONS

Nokia et al., "Support for Beam Based Common Control Plane", 3GPP TSG-RAN WG1#85, R1-165364, Nanjing, P.R. China, May 23-27, 2016, total 5 pages.

* cited by examiner

COMMUNICATION METHOD, AND COMMUNICATIONS APPARATUS AND SYSTEM

CROSS-REFERENCE TO RELATED APPLICATIONS

This application is a continuation of International Application No. PCT/CN2017/105683, filed on Oct. 11, 2017, which claims priority to Chinese Patent Application No. 201610895666.7, filed on Oct. 13, 2016. The disclosures of the aforementioned applications are hereby incorporated by reference in their entireties.

TECHNICAL FIELD

The present application relates to the field of wireless communications technologies, and in particular, to a communication method, and a communications apparatus and system.

BACKGROUND

Currently, with gradual saturation of a low frequency band (for example, below 6 GHz) of a wireless communications system and an increasing requirement for high-speed and large-capacity communication, using a high frequency band (for example, above 6 GHz) for communication becomes a trend. In a high-frequency wireless communications field, due to a frequency increase, a path loss increases, and a cell coverage area decreases. In this case, more network devices (such as base stations) in a same area need to be deployed to ensure coverage, significantly increasing network deployment costs. For avoiding an increase of the network deployment costs, a beamforming technology may be used. Beamforming is a multi-antenna processing technology, and provides a beam gain by using a plurality of antennas to form a narrower communication beam, so as to compensate for an increased path loss to some extent and ensure that a cell radius does not significantly decrease relative to that in a low frequency.

In the beamforming technology, there are a plurality of beams in a cell, user equipment (UE) in the cell listens to only information sent on one of the beams, and the information may include a broadcast message, an uplink and downlink scheduling message, and the like. The beam is a serving beam of the UE, and the serving beam is usually a beam with optimal signal quality in all beams that the UE can receive. A very narrow beam is usually used for obtaining a relatively large beam gain. To ensure continuous coverage in the cell, a plurality of narrow beams need to be used. In this way, when moving in the cell, the UE is confronted with a beam switching problem, to be specific, after moving from one beam coverage area of the cell to another beam coverage area, the serving beam needs to be switched.

In the prior art, UE measures different downlink beams and feeds back a measurement result to a base station, and the base station determines, based on the measurement result, whether a serving beam of the UE needs to be changed. If the serving beam of the UE needs to be changed, the base station delivers a beam switching instruction by using the current serving beam, so as to instruct the UE to start to listen to a signal of another beam at a next predetermined moment. In other words, the other beam is used as a next serving beam of the UE. In short, in the prior art, the base station initiates a beam switching process based on the beam measurement result fed back by the UE.

However, due to different cell scenarios, channel quality of a high-frequency communication channel in some cells is greatly changed, and the channel quality often greatly falls. In addition, a high-frequency signal has poor scattering and diffraction capabilities, and a signal propagation path is mostly a direct or refraction path and is also easily affected by an obstacle. Consequently, the high-frequency channel is more vulnerable for various reasons. Sometimes, a beam blocking phenomenon occurs. In this case, communication between the base station and the UE is adversely affected.

SUMMARY

The present disclosure provides a communication method, and a communications apparatus and system, to resolve a technical problem that communication is adversely affected in a beam blocking state.

According to a first aspect of embodiments of the present disclosure, a communication method is provided, where user equipment can communicate with a network device by using a plurality of beams, the plurality of beams include a first beam and at least one second beam, the first beam is a serving beam used by the user equipment to listen to control information, the second beam is a beam other than the serving beam, and the method includes: determining, by the user equipment, that the serving beam is blocked; and obtaining, by the user equipment, a first message from the network device by using the first beam or the second beam.

With reference to the first aspect, in a first optional embodiment of the first aspect, the method further includes: sending, by the user equipment, a response message in response to the first message, where the response message is used to indicate a beam used by the user equipment to obtain the first message.

With reference to the first optional embodiment of the first aspect, in a second optional embodiment of the first aspect, the method further includes: obtaining, by the user equipment, a beam switching message that is sent by the network device in response to the response message, where the beam switching message is used to indicate that one of the plurality of beams is a next serving beam of the user equipment.

With reference to the first aspect, in a third optional embodiment of the first aspect, the method further includes: sending, by the user equipment, a blocking message by using a preset uplink resource, where the blocking message is used to instruct the network device to send the first message in response to the blocking message.

With reference to the first, the second, or the third optional embodiment of the first aspect, in a fourth optional embodiment of the first aspect, the second beam includes a plurality of beams.

With reference to the fourth optional embodiment of the first aspect, in a fifth optional embodiment of the first aspect, the obtaining, by the user equipment, a first message from the network device by using the first beam or the second beam includes: receiving, by the user equipment on the first beam and each second beam, the first message sent by the network device; or searching, by the user equipment, for all beams in a preset beam combination, where the preset beam combination includes the first beam, or the first beam and any quantity of second beams; and receiving the first message that is sent by the network device by using any one or more beams in the preset beam combination; or selecting, by the user equipment at different time points by using a preconfigured correspondence between a beam and a time point, a corresponding single beam from the first beam and all second beams for performing a search; and receiving the first message that is sent by the network device by using the selected single beam; or searching, by the user equipment, for all the beams in the preset beam combination; when the first message is received on none of the beams in the preset beam combination, selecting, at different time points by using a preconfigured correspondence between a beam and a time point, a corresponding single beam from the plurality of beams or a beam outside the preset beam combination for performing a search; and receiving the first message that is sent by the network device by using the selected single beam.

With reference to the first optional embodiment of the first aspect, in a sixth optional embodiment of the first aspect, the first message carries one piece or a combination of indication information and data information.

With reference to the sixth optional embodiment of the first aspect, in a seventh optional embodiment of the first aspect, the indication information is a PDCCH order; the method further includes: in response to the PDCCH order, generating, by the user equipment, a preamble; and the sending, by the user equipment, a response message in response to the first message includes: sending, by the user equipment, the preamble on a preset random access resource in a beam used by the first message; or sending, by the user equipment, the preamble on a preset random access resource in all beams used by the first message; or determining, by the user equipment, a beam with a greatest communication quality value in all beams used by the first message, and sending the preamble on a preset random access resource in the determined beam; or after sending the preamble on a preset random access resource in a beam on which the first message is received, receiving, by the user equipment, the first message from another beam, and if a communication quality value of the another beam is greater than a communication quality value of the previous beam, sending the preamble on a preset random access resource in the another beam.

With reference to the sixth optional embodiment of the first aspect, in an eighth optional embodiment of the first aspect, the indication information is uplink scheduling indication information; the method further includes: determining, by the user equipment, a measurement report that includes communication quality of all beams; and the sending, by the user equipment, a response message in response to the first message includes: sending, by the user equipment, the measurement report by using a preset time-frequency resource in any beam used by the first message.

With reference to the second optional embodiment of the first aspect, in a ninth optional embodiment of the first aspect, the method further includes: measuring, by the user equipment, channel quality of at least one of the plurality of beams in a plurality of consecutive preset time periods in response to the blocking of the serving beam; separately comparing, by the user equipment, a channel quality value in each time period with a preset reliability threshold and a preset unreliability threshold, where the preset reliability threshold is greater than the preset unreliability threshold; and if channel quality measured in each of the plurality of consecutive preset time periods is lower than the preset unreliability threshold, starting, by the user equipment, a preset timer; or if channel quality measured in each of the plurality of consecutive preset time periods after the preset timer is started is higher than the preset reliability threshold, terminating, by the user equipment, the preset timer; or if channel quality measured in none of the plurality of consecutive preset time periods after the preset timer is started is higher than the preset reliability threshold, and the preset timer expires, triggering, by the user equipment, a cell reselection procedure.

According to a second aspect of embodiments of the present disclosure, a communication method is provided, where user equipment can communicate with a network device by using a plurality of beams, the plurality of beams include a first beam and at least one second beam, the first beam is a serving beam used by the user equipment to listen to control information, the second beam is a beam other than the serving beam, and the method includes: determining, by the network device, that the serving beam is blocked; and sending, by the network device, a first message by using the first beam or the second beam.

With reference to the second aspect, in a first optional embodiment of the second aspect, the determining, by the network device, that the serving beam is blocked includes: if the network device does not receive, within preset duration after the network device sends a second message, a feedback message that is sent by the user equipment in response to the second message, determining, by the network device, that the serving beam is blocked; or if the network device receives a blocking message that is sent by the user equipment by using the first beam or the second beam, determining, by the network device, that the serving beam is blocked.

With reference to the second aspect, in a second optional embodiment of the second aspect, the method further includes: obtaining, by the network device, a response message that is sent by the user equipment in response to the first message, where the response message is used to indicate a beam used by the user equipment to obtain the first message; and sending, by the network device, a beam switching message in response to the response message, where the beam switching message is used to indicate that one of the plurality of beams is a next serving beam of the user equipment.

With reference to the second aspect, the first optional embodiment of the second aspect, or the second optional embodiment of the second aspect, in a third optional embodiment of the second aspect, the second beam includes a plurality of beams.

With reference to the third optional embodiment of the second aspect, in a fourth optional embodiment of the second aspect, the sending, by the network device, a first message by using the first beam or the second beam includes: sending, by the network device, the first message by using the first beam and each second beam; or sending, by the network device, the first message by using all beams in a preset beam combination, where the preset beam combination includes the first beam, or the first beam and any quantity of second beams; or selecting, by the network device, a corresponding single beam from the first beam and all second beams at different time points by using a preconfigured correspondence between a beam and a time point; and sending the first message by using the selected single beam; or sending, by the network device, the first message by using all the beams in the preset beam combination; if the response message that is sent by the user equipment in response to the first message is received on none of the beams in the preset beam combination, selecting a corresponding single beam from the plurality of beams or a beam outside the preset beam combination at different time points by using a preconfigured correspondence between a beam and a time point; and sending the first message by using the selected single beam.

With reference to the first optional embodiment of the second aspect, in a fifth optional embodiment of the second aspect, the first message carries one piece or a combination of indication information and data information.

With reference to the fifth optional embodiment of the second aspect, in a sixth optional embodiment of the second aspect, the indication information is a PDCCH order; and the obtaining, by the network device, a response message that is sent by the user equipment in response to the first message includes: receiving, by the network device, a preamble that is sent by the user equipment by using one or more beams.

With reference to the sixth optional embodiment of the second aspect, in a seventh optional embodiment of the second aspect, the method further includes: if the preamble is received by using one beam, determining, as a next serving beam by the network device, the beam used by the preamble; or if the preamble is received by using at least two beams, determining, by the network device, a beam with a greatest communication quality value in the at least two beams as a next serving beam; or if the preamble is received by using at least two beams, determining, as a next serving beam by the network device, a beam used by a last received preamble; and the sending, by the network device, a beam switching message in response to the response message includes: sending, by the network device, identification information of the next serving beam in response to the response message.

With reference to the fifth optional embodiment of the second aspect, in an eighth optional embodiment of the second aspect, the indication information is uplink scheduling indication information; and the obtaining, by the network device, a response message that is sent by the user equipment in response to the first message includes: receiving, by the network device, a measurement report that is of all of the plurality of beams and that is sent by the user equipment by using one beam.

With reference to the eighth optional embodiment of the second aspect, in a ninth optional embodiment of the second aspect, the method further includes: determining, as a next serving beam by the network device, a beam with a greatest signal power in all of the plurality of beams in response to the measurement report; and the sending, by the network device, a beam switching message in response to the response message includes: sending, by the network device, identification information of the next serving beam.

According to a third aspect of embodiments of the present disclosure, a communications apparatus is provided, applied to user equipment, where the user equipment can communicate with a network device by using a plurality of beams, the plurality of beams include a first beam and at least one second beam, the first beam is a serving beam used by the user equipment to listen to control information, the second beam is a beam other than the serving beam, and the apparatus includes: a processing module, configured to determine that the serving beam is blocked; and a receiving module, configured to obtain a first message from the network device by using the first beam or the second beam.

With reference to the third aspect, in a first optional embodiment of the third aspect, the apparatus further includes: a sending module, configured to send a response message in response to the first message, where the response message is used to indicate a beam used by the receiving module to obtain the first message.

With reference to the first optional embodiment of the third aspect, in a second optional embodiment of the third aspect, the receiving module is further configured to obtain a beam switching message that is sent by the network device in response to the response message, where the beam switching message is used to indicate that one of the plurality of beams is a next serving beam of the user equipment.

With reference to the third aspect, in a third optional embodiment of the third aspect, the sending module is further configured to send a blocking message by using a preset uplink resource, where the blocking message is used to instruct the network device to send the first message in response to the blocking message.

With reference to the first, the second, or the third optional embodiment of the third aspect, in a fourth optional embodiment of the third aspect, the second beam includes a plurality of beams.

With reference to the fourth optional embodiment of the third aspect, in a fifth optional embodiment of the third aspect, that the receiving module is configured to obtain a first message from the network device by using the first beam or the second beam is specifically: the receiving module is configured to receive, on the first beam and each second beam, the first message sent by the network device; or the receiving module is configured to: search for all beams in a preset beam combination, where the preset beam combination includes the first beam, or the first beam and any quantity of second beams; and receive the first message that is sent by the network device by using any one or more beams in the preset beam combination; or the receiving module is configured to: select, at different time points by using a preconfigured correspondence between a beam and a time point, a corresponding single beam from the first beam and all second beams for performing a search; and receive the first message that is sent by the network device by using the selected single beam; or the receiving module is configured to: search for all the beams in the preset beam combination; when the first message is received on none of the beams in the preset beam combination, select, at different time points by using a preconfigured correspondence between a beam and a time point, a corresponding single beam from a beam outside the preset beam combination for performing a search; and receive the first message that is sent by the network device by using the selected single beam.

With reference to the first optional embodiment of the third aspect, in a sixth optional embodiment of the third aspect, the first message carries one piece or a combination of indication information and data information.

With reference to the sixth optional embodiment of the third aspect, in a seventh optional embodiment of the third aspect, the indication information is a PDCCH order; the processing module is further configured to generate a preamble in response to the PDCCH order; and that the sending module is configured to send a response message in response to the first message is specifically: the sending module is configured to send the preamble on a preset random access resource in a beam used by the first message; or the sending module is configured to send the preamble on a preset random access resource in all beams used by the first message; or the sending module is configured to: determine a beam with a greatest signal power in all beams used by the first message, and send the preamble on a preset random access resource in the beam with the greatest power; or the sending module is configured to: after sending the preamble on a preset random access resource in a beam on which the first message is received, receive the first message from another beam, and if a signal power of the another beam is greater than a signal power of the previous beam, send the preamble on a preset random access resource in the another beam.

With reference to the sixth optional embodiment of the third aspect, in an eighth optional embodiment of the third aspect, the indication information is uplink scheduling indication information; the processing module is further configured to determine a measurement report that includes communication quality of all beams; and that the sending module is configured to send a response message in response to the first message is specifically: the sending module is configured to send the measurement report by using a preset time-frequency resource in any beam used by the first message.

With reference to the second optional embodiment of the third aspect, in a ninth optional embodiment of the third aspect, the processing module is further configured to: measure channel quality of at least one of the plurality of beams in a plurality of consecutive preset time periods in response to the blocking of the serving beam; separately compare a channel quality value in each time period with a preset reliability threshold and a preset unreliability threshold, where the preset reliability threshold is greater than the preset unreliability threshold; and if channel quality measured in each of the plurality of consecutive preset time periods is lower than the preset unreliability threshold, start a preset timer; or if channel quality measured in each of the plurality of consecutive preset time periods after the preset timer is started is higher than the preset reliability threshold, terminate the preset timer; or if channel quality measured in none of the plurality of consecutive preset time periods after the preset timer is started is higher than the preset reliability threshold, trigger a cell reselection procedure.

According to a fourth aspect of embodiments of the present disclosure, a communications apparatus is provided, applied to a network device, where user equipment can communicate with the network device by using a plurality of beams, the plurality of beams include a first beam and at least one second beam, the first beam is a serving beam used by the user equipment to listen to control information, the second beam is a beam other than the serving beam, and the apparatus includes: the processing module, configured to determine that the serving beam is blocked; and the sending module, configured to send a first message by using the first beam or the second beam.

With reference to the fourth aspect, in a first optional embodiment of the fourth aspect, the apparatus further includes a receiving module; and that the processing module is configured to determine that the serving beam is blocked is specifically: if the receiving module does not receive, within preset duration after the network device sends a second message, a feedback message that is sent by the user equipment in response to the second message, the processing module is configured to determine that the serving beam is blocked; or if the receiving module receives a blocking message that is sent by the user equipment by using the first beam or the second beam, the processing module is configured to determine that the serving beam is blocked.

With reference to the fourth aspect, in a second optional embodiment of the fourth aspect, the receiving module is further configured to obtain a response message that is sent by the user equipment in response to the first message, where the response message is used to indicate a beam used by the user equipment to obtain the first message; and the sending module is further configured to send, by the network device, a beam switching message in response to the response message, where the beam switching message is used to indicate that one of the plurality of beams is a next serving beam of the user equipment.

With reference to the fourth aspect, the first optional embodiment of the fourth aspect, or the second optional embodiment of the fourth aspect, in a third optional embodiment of the fourth aspect, the second beam includes a plurality of beams.

With reference to the third optional embodiment of the fourth aspect, in a fourth optional embodiment of the fourth aspect, that the sending module is configured to send a first message by using the first beam or the second beam is specifically: the sending module is configured to send the first message by using the first beam and each second beam; or the sending module is configured to send the first message by using all beams in a preset beam combination, where the preset beam combination includes the first beam, or the first beam and any quantity of second beams; or the sending module is configured to: select a corresponding single beam from the first beam and all second beams at different time points by using a preconfigured correspondence between a beam and a time point; and send the first message by using the selected single beam; or the sending module is configured to: send the first message by using all the beams in the preset beam combination; if the response message that is sent by the user equipment in response to the first message is received on none of the beams in the preset beam combination, select a corresponding single beam from the plurality of beams or a beam outside the preset beam combination at different time points by using a preconfigured correspondence between a beam and a time point; and send the first message by using the selected single beam.

With reference to the first optional embodiment of the fourth aspect, in a fifth optional embodiment of the fourth aspect, the first message carries one piece or a combination of indication information and data information.

With reference to the fifth optional embodiment of the fourth aspect, in a sixth optional embodiment of the fourth aspect, the indication information is a PDCCH order; and that the receiving module is configured to obtain a response message that is sent by the user equipment in response to the first message is specifically: the receiving module is configured to receive a preamble that is sent by the user equipment by using one or more beams.

With reference to the sixth optional embodiment of the fourth aspect, in a seventh optional embodiment of the fourth aspect, the processing module is further configured to: if the preamble is received by using one beam, determine, as a next serving beam, the beam used by the preamble; or if the preamble is received by using at least two beams, determine a beam with a greatest signal power in the at least two beams as a next serving beam; or if the preamble is received by using at least two beams, determine, as a next serving beam, a beam used by a last received preamble; and that the sending module is configured to send a beam switching message in response to the response message is specifically: the sending module is configured to send identification information of the next serving beam in response to the response message.

With reference to the fifth optional embodiment of the fourth aspect, in an eighth optional embodiment of the fourth aspect, the indication information is uplink scheduling indication information; and that the receiving module is configured to obtain a response message that is sent by the user equipment in response to the first message is specifically: the receiving module is configured to receive a measurement report that is of all of the plurality of beams and that is sent by using one beam.

With reference to the eighth optional embodiment of the fourth aspect, in a ninth optional embodiment of the fourth aspect, the processing module is further configured to determine, as a next serving beam, a beam with a greatest signal power in all of the plurality of beams in response to the measurement report; and that the sending module is configured to send a beam switching message in response to the response message is specifically: the sending module is configured to send identification information of the next serving beam in response to the response message.

According to a fifth aspect of embodiments of the present disclosure, a communications system is provided, including user equipment and a network device, where the user equipment may include the communications apparatus according to any optional embodiment of the third aspect, and the network device may include the communications apparatus according to any optional embodiment of the fourth aspect.

According to the method provided in the embodiments of the present disclosure, the UE may determine that the serving beam is blocked, and further obtain the first message sent by the network device, thereby eliminating an adverse effect caused by the blocking of the serving beam. Correspondingly, the network device may also determine that the serving beam is blocked, and further send the first message, thereby eliminating an adverse effect caused by the blocking of the serving beam.

Further, the next serving beam may be determined through information exchange, so that the UE is handed over from a previous serving beam to the next serving beam, and recovers communication with the network device.

It should be understood that the foregoing general description and the following detailed description are merely examples and explanations, and cannot limit the present disclosure.

In other embodiments, there is provided a communications system, including user equipment and a network device, wherein the user equipment is as described according to any embodiment, aspect or optional implementation set forth above, and the network device is as described according to any embodiment, aspect or optional implementation set for the above.

In other embodiments, there is provided a computer-readable storage medium or computer program product, including instructions which, when executed by a device, cause the device to perform any of the methods as described according to any embodiment, aspect or optional implementation set forth above.

In other embodiments, there is provided an apparatus including a memory, a processor, and a computer program stored in the memory which, when executed by the processor, causes the apparatus to implement any of the methods as described according to any embodiment, aspect or optional implementation set forth above.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, a person of ordinary skill in the art may derive other drawings from these accompanying drawings without creative efforts. In addition, the description does not constitute a limitation on the embodiments, elements that have a same reference sign number in the accompanying drawings indicate similar elements, and unless otherwise stated, a figure in the accompanying drawings does not constitute a proportional limitation.

DESCRIPTION OF EMBODIMENTS

Example embodiments are described in detail herein, and examples of the example embodiments are presented in the accompanying drawings. When the following description relates to the accompanying drawings, unless specified otherwise, same numbers in different accompanying drawings represent a same or similar element. Implementations described in the following example embodiments do not represent all implementations consistent with the present disclosure. On the contrary, they are only examples of apparatuses and methods that are described in the appended claims in detail and that are consistent with some aspects of the present disclosure.

For example, embodiments of the present disclosure may be used for a cellular communications system, for example, may be used for a Long Term Evolution (LTE) cellular communications system, or may be used for a 5G or new radio (NR) communications system.

Figure 1:
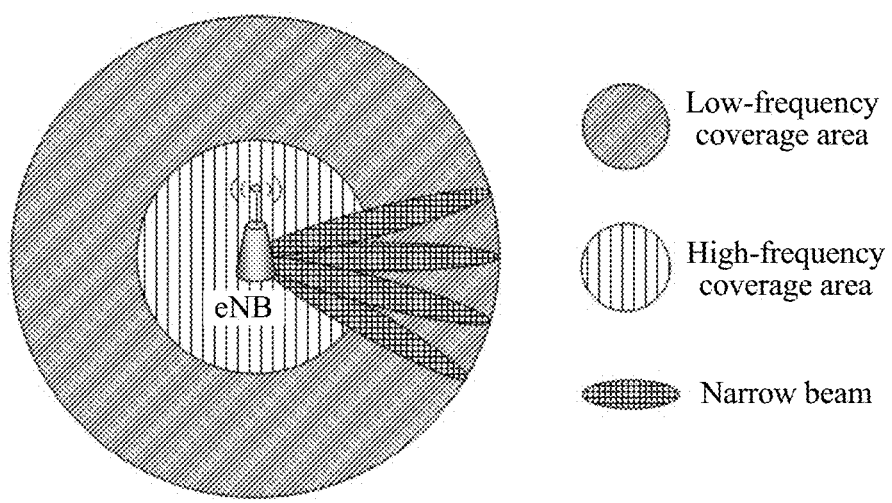
FIG. 1 is a schematic diagram of base station coverage according to an embodiment of the present disclosure.

For the LTE communications system, there are a plurality of cells of each evolved NodeB (eNodeB, eNB). An eNB in each cell may use a plurality of beams to complete cell coverage. For example, as shown in FIG. 1, an eNB in FIG. 1 is a base station in the LTE system. A coverage area is expanded by forming a narrow beam (which may be simply referred to as a beam below) in a downlink direction, and receiving may also be performed in beam domain in an uplink direction.

Figure 2:
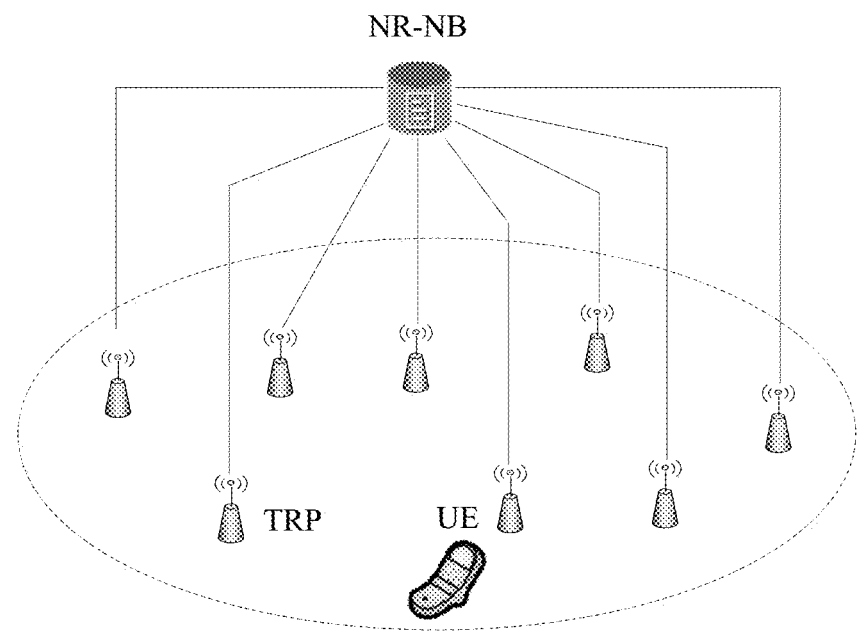
FIG. 2 is a schematic diagram of a TRP layout according to an embodiment of the present disclosure.

For the 5G or NR system, there may be one or more transmission reception points (TRP) of a new radio NodeB (NR-NB). A TRP is a wireless signal transceiver unit in the 5G or NR system. A coverage area is expanded by forming a narrow beam in a downlink direction, and receiving may also be performed in beam domain in an uplink direction. For example, as shown in FIG. 2, each TRP can form a plurality of beams to communicate with UE.

The UE determines an available beam by searching for a pilot signal sent by the eNB or the TRP, and feeds back a selection result to the eNB or the TRP. In addition, if a plurality of antennas are deployed on a UE side, a beamforming transceiving technology may also be used on the UE side.

Figure 3:
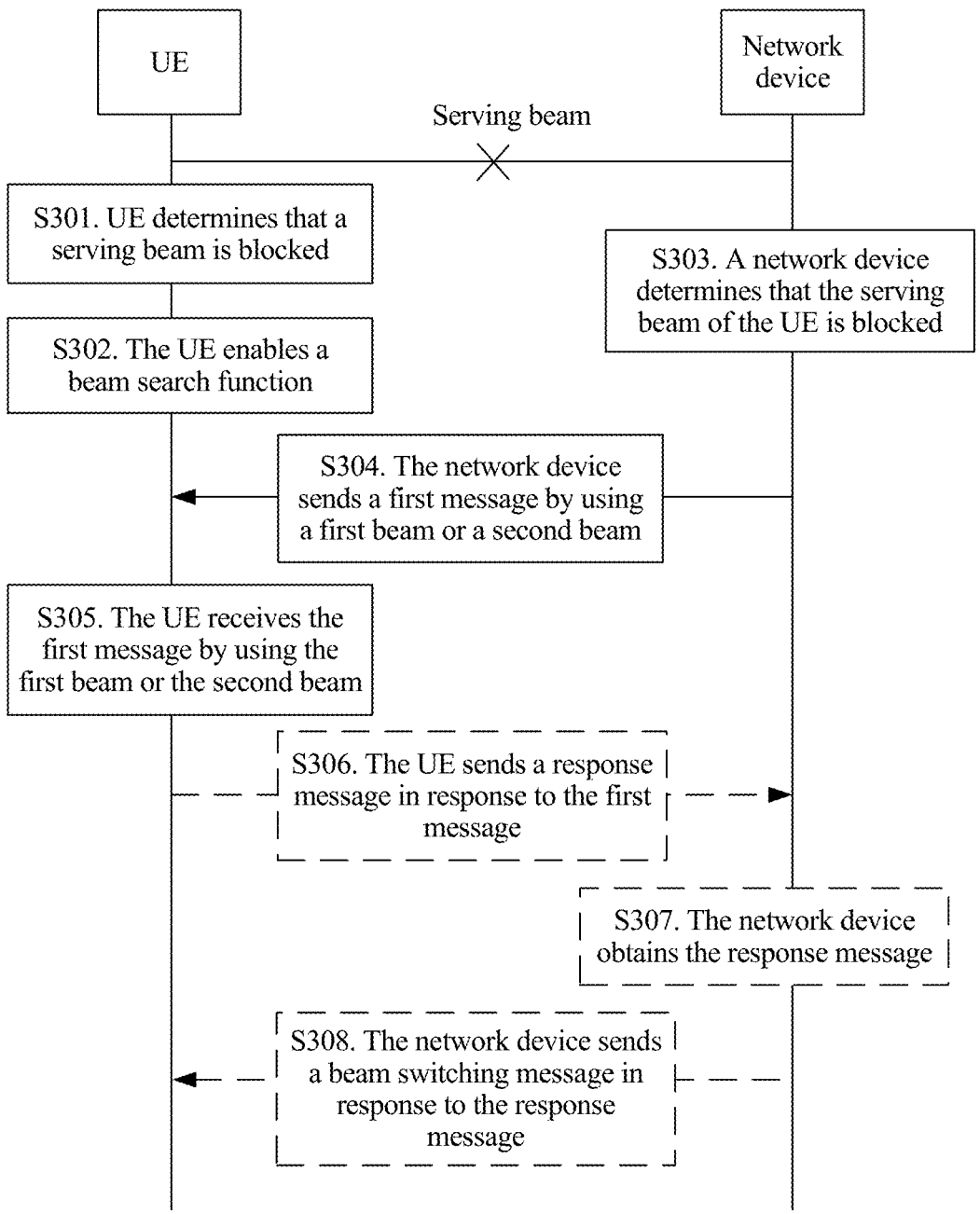
FIG. 3 is a schematic diagram of signaling of a communication method according to an embodiment of the present disclosure.

FIG. 3 is a schematic diagram of signaling of a communication method according to an example embodiment of the present disclosure. The communication method is applied to a communications system that includes user equipment UE and a network device, and the user equipment can communicate with the network device by using a plurality of beams. In this embodiment, the UE does not have an uplink resource used for feeding back, to the network device (for example, a base station), a case in which a serving beam is blocked.

S301. The UE determines that a serving beam is blocked.

In this embodiment, that the serving beam is blocked means that signal quality of the serving beam of the UE is lower than a first threshold. For example, in a particular scenario, a case in which signal quality of a beam received on a UE side suddenly falls below the first threshold may occur, in other words, a beam blocking phenomenon occurs. In this case, normal communication between the UE and the network device is blocked. For the network device, the UE in this case is in an offline state to some extent.

When the serving beam is blocked, usually, the UE may first find the case by measuring beam quality in real time. For example, when the UE finds that a reference signal received power (RSRP) of the serving beam is less than the first threshold, it may be considered that the serving beam is blocked. For example, the first threshold may be notified to the UE by using a radio resource control (RRC) message or specified in a communications protocol, and the first threshold may usually correspond to a minimum RSRP that can be used to accurately detect a physical downlink control channel (PDCCH).

S302. The UE enables a beam search function.

For the UE, if no uplink resource is preset for the UE to feed back a beam measurement result, the case in which the serving beam is blocked, or the like to the network device, to recover communication, the UE can determine, only by searching for information delivered by the network device, whether a beam that can be used to establish communication with the network device exists.

In this embodiment of the present disclosure, after the serving beam is blocked, the UE starts a blind search (in other words, an attempt), to be specific, the UE searches for the first message from the network device on one or more of the plurality of beams, so as to re-establish communication with the network device by using these beams on which the first message is found.

A specific search range may be configured by the network device or specified in a protocol. For example, the UE may search for control or scheduling information on a plurality of downlink beams, for example, the UE searches for a PDCCH indication by using a cell radio network temporary identifier (C-RNTI). If the UE can search for the plurality of beams at the same time, the UE may search for the plurality of beams at the same time. However, if the UE has a limited capability and can perform detection only on a single beam at any time point, the network device may preconfigure a correspondence between a beam and a time point and notify the UE, and further, the UE may search for different beams at different time points based on the correspondence. In addition, in this embodiment of the present disclosure, to improve search efficiency of the UE, the network device may further preconfigure a manner in which the UE searches for a beam. For example, the UE searches for a preset beam combination at the same time. When the first message is not found, in consideration of a power or another factor, the UE searches for a single beam in remaining beams based on the correspondence between a beam and a time point. For example, the preset beam combination includes at least the serving beam, and may further include a candidate beam or a beam with better communication quality selected based on a current beam measurement result, and the candidate beam is a beam that is most recently reported by the UE to the network device other than the serving beam.

In this embodiment of the present disclosure, the first message is not limited in this embodiment. For example, the first message may be uplink scheduling information, downlink scheduling information that carries downlink data, downlink scheduling information that does not carry downlink data, configuration information, downlink data, or the like. Usually, only if the first message is information sent by the network device, it may indicate that a current beam may be used by the UE.

S303. A network device determines that the serving beam of the UE is blocked.

For example, when the network device finds, after sending data to the UE by using the serving beam of the UE, that the UE does not perform corresponding feedback, it may be considered that the serving beam of the UE is abnormal, in other words, blocking occurs.

For example, if the network device does not receive, within preset duration after sending the downlink data to the UE, acknowledgement (ACK) or negative acknowledgement (NACK) information fed back by the UE, or if the network device does not receive, within preset duration after sending the uplink scheduling to the UE, data sent by the UE to the network device, the network device may consider that the serving beam of the UE is abnormal.

S304. The network device sends a first message by using the first beam or a second beam.

In this embodiment, the UE does not have the uplink resource used for feeding back, to the network device, the case in which the serving beam is blocked, to be specific, the network device cannot learn of a status of the UE. Therefore, the network device may send the first message to the UE, so as to determine an available beam between the network device and the UE by using feedback information of the UE in response to the first message.

When sending the first message, the network device may use a random sending policy, to be specific, the network device randomly selects any one or more beams to send the first message. Because the network device uses the random sending policy, the UE does not know the sending policy of the network device, and further, the UE may find, through blind search, the first message sent by the network device.

In addition, the network device may further send the first message according to a preset sending policy. For example, according to the preset sending policy, on the one or more of the plurality of beams, the network device periodically sends the first message or sends the first message based on the preconfigured correspondence between a beam and a time point. When the network device sends the first message according to the preset sending policy, although the UE may still receive the first message in a blind search manner, to save energy consumption of the UE during the blind search, the network device may further notify the UE of the preset sending policy in advance. Further, when searching, the UE may pertinently search according to the preset sending policy, thereby improving accuracy of the search, and reducing energy consumption when searching for an unavailable beam.

In this embodiment of the present disclosure, although the serving beam of the UE is blocked, the network device still considers sending the first message on the serving beam. This considers that, because the serving beam may be affected by an obstacle or another external factor, signal quality suddenly greatly falls, but the signal quality of the serving beam may be recovered in a short time as the UE moves or the external factor is removed. Therefore, when sending the first message, the network device may still send the first message on the serving beam.

S305. The UE receives the first message by using the first beam or the second beam.

In this embodiment of the present disclosure, by performing step S302 and step S305, the UE may obtain the first message from the network device by using the first beam or the second beam.

At this point, the UE may determine that the serving beam is blocked, and further obtain the first message sent by the network device, thereby eliminating an adverse effect caused by the blocking of the serving beam. Correspondingly, the network device may also determine that the serving beam is blocked, and further send the first message, thereby eliminating an adverse effect caused by the blocking of the serving beam.

Further, in the communication method provided in this embodiment of the present disclosure, one or a combination of the following steps may further be used based on the foregoing steps.

S306. The UE sends a response message in response to the first message.

The response message is used to indicate a beam used by the UE to obtain the first message. In this embodiment of the present disclosure, the response message may also change accordingly based on different types of first messages. For example, if finding the downlink data, the UE feeds back an ACK or a NACK based on a cyclic redundancy check (CRC) check result; and if finding the uplink scheduling, the UE sends data on a corresponding resource, and the like.

After finding the first message from the network device on any of the plurality of beams, the UE may perform corresponding feedback to the network device. In this embodiment of the present disclosure, if the UE receives the first message only by using one beam, when the UE feeds back the response message, the UE still sends the response message to the network device by using the beam on which the first message is received. However, if the UE receives the first message by using two or more beams, when the UE feeds back the response message, the UE may send the response message to the network device by using each beam on which the first message is received, or may select a beam from beams on which the first message is received, and then send the response message to the network device by using the selected beam. When the beam is selected, a beam with highest signal quality may be used as a beam for sending the response message.

S307. The network device obtains the response message.

The response message is used to indicate the beam used by the UE to obtain the first message.

For details of a description of the response message and a manner of sending the response message, refer to the description in step S306. Details are not described herein again.

S308. The network device sends a beam switching message in response to the response message.

The beam switching message is used to indicate that one of the plurality of beams is a next serving beam of the UE. In this embodiment of the present disclosure, the beam switching message may be a message used when the UE is normally handed over from a beam in the art.

After receiving the response message sent by the UE, the network device may determine that a beam better than the current serving beam that is blocked may be used between the network device and the UE. Further, the network device may redetermine one beam as the next serving beam of the UE, and claim the beam switching message, so that after receiving the beam switching message, the UE may be handed over to the next serving beam.

When receiving the response message of the UE only by using one beam, the network device directly determines, as the next serving beam, the beam on which the response message is received. When receiving the response message of the UE by using two or more beams, the network device may select, as the next serving beam, one beam from beams on which the response message is received. When the beam is selected, a beam with highest signal quality may be used as the next serving beam.

In this embodiment of the present disclosure, the beam switching message may carry identification information of the next serving beam. In addition, when the beam switching message is sent, the beam switching message may be sent on the next serving beam, or may be sent on any other beams on which the response message is received.

S309. The UE obtains the beam switching message that is sent by the network device in response to the response message.

The beam switching message is used to indicate that the beam of the plurality of beams is the next serving beam of the UE.

After the UE receives the beam switching message, the UE may be handed over from the current serving beam to the next serving beam based on the beam switching message. In this way, normal communication between the UE and the network device is recovered.

In the method provided in this embodiment of the present disclosure, the next serving beam may be determined through information exchange, so that the UE is handed over from a previous serving beam to the next serving beam, and recovers communication with the network device.

In a scenario, that the network device sends the first message by using one or a combination of the first beam and the second beam may include the following manners:

Manner 1: The network device sends the first message by using the first beam and each second beam.

Manner 2: The network device sends the first message by using all beams in the preset beam combination, and the preset beam combination includes the first beam, or the first beam and any quantity of second beams.

For example, the preset beam combination includes at least the serving beam, and may further include a candidate beam or a beam with better communication quality selected based on a current beam measurement result, and the candidate beam is a beam that is most recently reported by the UE to the network device other than the serving beam.

To distinguish from Manner 1, in this embodiment of the present disclosure, a quantity of beams in the preset beam combination is less than a sum of a quantity of first beams and a quantity of second beams. For sending the first message on each beam in the preset beam combination, refer to a manner of sending the first message in Manner 1. Details are not described herein again.

Manner 3:

The network device selects a corresponding single beam from the first beam and all second beams at different time points by using the preconfigured correspondence between a beam and a time point, and sends the first message by using the selected single beam.

Manner 4:

The network device sends the first message by using all the beams in the preset beam combination; if the response message that is sent by the UE in response to the first message is received on none of the beams in the preset beam combination, selects a corresponding single beam from the plurality of beams or a beam outside the preset beam combination at different time points by using the preconfigured correspondence between a beam and a time point; and sends the first message by using the selected single beam.

For example, this may be divided into two phases. In a first phase, the first message is sent to the UE by using all the beams in the preset beam combination. When the first message is sent on each beam in the first phase, different beams may be used at different time points (at a subframe level or a symbol level).

If a feedback of the UE is still not obtained through the sending of the first phase, sending may be performed in a second phase, to be specific, the first message is sent to the UE on all the beams or on all beams except a beam in the first phase. In addition, in the second phase, to reduce system resource consumption, the first message may be sent only at a preset time point on each beam, to be specific, the first message may be sent to the UE only at a corresponding time point on each of all the beams or all the beams except the beam in the first phase based on the configured correspondence between a beam and a time point, and the correspondence between a beam and a time point may be notified by the network device to the UE or specified in a protocol. In addition, to reduce resource consumption, in the second phase, the network device may alternatively send a PDCCH but does not carry the downlink data.

The foregoing enumerated four manners are example descriptions used for ease of understanding this embodiment of the present disclosure, a person skilled in the art easily figures out other similar manners based on the foregoing four manners, and these similar manners also fall within the protection scope of the present disclosure.

In Manner 1 and Manner 2 in the foregoing scenario, the network device may send the first message to the UE by using the plurality of beams at the same time. However, in another scenario, if the network device cannot send data to the UE by using the plurality of beams at the same time, the network device may send the data to the UE in a time division manner only by using a limited quantity of beams at any time, and traverse all the beams over a period of time, such as Manner 3 and Manner 4 in the foregoing scenario.

For example, the network device may select two modes on a plurality of different beams for sending the data (retransmission). Mode 1: The network device performs retransmission M times on the single beam (M is specified in a protocol or is implemented depending on the network device), and sequentially traverses all the beams, where a sequence of traversal may start from an optimal beam and end with a worst beam based on a previous measurement result; or transmits data on the plurality of beams at the same time. Mode 2: The network device performs retransmission only once on the single beam, sequentially traverses all the beams to complete one round of retransmission, and may complete N rounds of transmission in total (N is specified in the protocol or depends on the base station for implementation). The data retransmitted each time may be an uplink grant (UL Grant) or an uplink scheduling indication, downlink assignment (DL Assignment) or a downlink scheduling indication and downlink data, another PDCCH indication, or the like.

In a scenario, that the UE searches for the first message from the network device on one or a combination of the first beam and the second beam may include the following manners:

Manner 1: The UE receives, on the first beam and each second beam, the first message sent by the network device.

Manner 2:

The UE searches for all the beams in the preset beam combination, where the preset beam combination includes the first beam, or the first beam and any quantity of second beams; and receives the first message that is sent by the network device by using any one or more beams in the preset beam combination.

Manner 3:

The UE selects, at different time points by using the preconfigured correspondence between a beam and a time point, a corresponding single beam from the first beam and all second beams for performing a search, and receives the first message that is sent by the network device by using the selected single beam.

Manner 4:

The UE searches for all the beams in the preset beam combination; when the first message is received on none of the beams in the preset beam combination, selects, at different time points by using the preconfigured correspondence between a beam and a time point, a corresponding single beam from a beam outside the preset beam combination for performing a search; and receives the first message that is sent by the network device by using the selected single beam.

The network device may preconfigure the correspondence between a beam and a time point, and the network device notifies the UE of the preconfigured correspondence between a beam and a time point in advance.

The foregoing enumerated four manners are example descriptions used for ease of understanding this embodiment of the present disclosure, a person skilled in the art easily figures out other similar manners based on the foregoing four manners, and these similar manners also fall within the protection scope of the present disclosure.

In a scenario, the first message may be a physical downlink control channel PDCCH order that triggers random access.

In response to the PDCCH order, the UE may generate a preamble as the response message. In addition, that the UE sends a response message in response to the first message may include the following manners:

Manner 1: The UE sends the preamble on a preset random access resource in a beam used by the first message.

When the UE receives the PDCCH order by using a beam, the UE selects, based on the beam used when the PDCCH order is received and a configured correspondence between a beam and a random access resource, a corresponding access resource on the beam used when the PDCCH order is received, for sending the preamble, so that the network device learns of the beam used when the UE receives the PDCCH order.

Manner 2: The UE sends the preamble on a preset random access resource in all beams used by the first message.

When the UE receives the PDCCH order by using a plurality of beams, the UE may further separately select, based on a correspondence between each beam and a random access resource, a corresponding access resource on each beam, for sending the preamble, so that the network device learns of a beam used when the UE receives the PDCCH order.

Manner 3:

The UE determines a beam with a greatest communication quality value in all beams used by the first message, and sends the preamble on a preset random access resource in the determined beam.

When the UE receives the PDCCH order by using a plurality of beams, the UE may further select a beam from the plurality of beams, determine the beam with the greatest communication quality value as a sending beam of the first message, and send the first message on the beam. In this embodiment of the present disclosure, a communication quality value is a value that may be commonly used to reflect beam quality in the art, for example, a reference signal received power (RSRP), and reference signal received quality (RSRQ).

In this manner, when receiving the PDCCH order by using the plurality of beams, the UE selects a beam with optimal communication quality when sending the first message, so that the network device may subsequently determine the beam with optimal communication quality as the next serving beam, thereby improving communication quality when the UE uses the next serving beam.

Manner 4:

After sending the preamble on a preset random access resource in a beam on which the first message is received, the UE receives the first message from another beam, and if a communication quality value of the another beam is greater than a communication quality value of the previous beam, sends the preamble on a preset random access resource in the another beam.

When the UE receives the PDCCH order by using the plurality of beams, the UE may further compare signal quality of each beam on which the PDCCH order is received, and first send the preamble according to a first received PDCCH order. Then, if signal quality of a subsequent beam is higher than that of a first beam, the UE sends the preamble according to a PDCCH order of the beam. Next, if signal quality of a subsequent beam is higher than signal quality of a current optimal beam, the UE sends the preamble according to a PDCCH order of the beam. In this manner, a last preamble sent by the UE corresponds to the current optimal beam. Based on a sequence in which the network device receives the preamble by using a beam, the network device can conveniently learn of communication quality of the beam and master an optimal beam.

The foregoing enumerated four manners are example descriptions used for ease of understanding this embodiment of the present disclosure, a person skilled in the art easily figures out other similar manners based on the foregoing four manners, and these similar manners also fall within the protection scope of the present disclosure.

Corresponding to the foregoing plurality of manners of sending the response message by the UE, before sending the beam switching message, the network device may determine the next serving beam in a plurality of manners.

Manner 1: If the preamble is received by using one beam, the network device determines, as the next serving beam, the beam used by the preamble.

Referring to Manner 1 and Manner 3 of sending the response message by the UE, the preamble received by the network device has only one beam. Therefore, the network device may determine, as the next serving beam, the beam used by the preamble.

Manner 2: If the preamble is received by using at least two beams, the network device determines a beam with a greatest signal power in the at least two beams as the next serving beam.

Referring to Manner 2 of sending the response message by the UE, because the UE sends the response message by using the plurality of beams, the network device receives the preamble by using the at least two beams. In this case, the network device measures communication quality of each beam, and then determines a beam with a greatest communication quality value as the next serving beam.

Manner 3: If the preamble is received by using at least two beams, the network device determines, as the next serving beam, a beam used by a last received preamble.

Referring to Manner 4 of sending the response message by the UE, the UE sends the response message on the plurality of beams once, and beam communication quality of the subsequent beam used to send the preamble is better than that of the previous beam used to send the preamble. Therefore, the network device may learn that communication quality of the beam used by the last received preamble is optimal, and may further determine, as the next serving beam, the beam used by the last received preamble.

Regardless of a manner of determining the next serving beam, when delivering the beam switching message, the network device may directly send the identification information of the next serving beam to the UE, so that the UE may be handed over the next serving beam.

In another scenario, the first message may be an uplink scheduling grant UL Grant sent by using a PDCCH.

In response to the UL Grant, the UE measures communication quality of all beams, and obtains a measurement report of all the beams as the response message.

Correspondingly, when sending the response message to the network device, the UE may send the measurement report to the network device by using a preset time-frequency resource in any beam used by the first message.

That the network device determines the next serving beam based on the response message may include:

determining, as the next serving beam, a beam with a greatest signal power in all of the plurality of beams in response to the measurement report; and using, by the network device, the identification information of the next serving beam as the beam switching message, and sending the beam switching message to the UE.

In a manner of sending the UL Grant, the UE only needs to report beam information on a resource indicated by the first UL Grant, for example, a measurement result of the plurality of beams. Then, the network device may select an optimal beam to send downlink data, and the UE also only needs to listen to data on the optimal beam.

Figure 4:
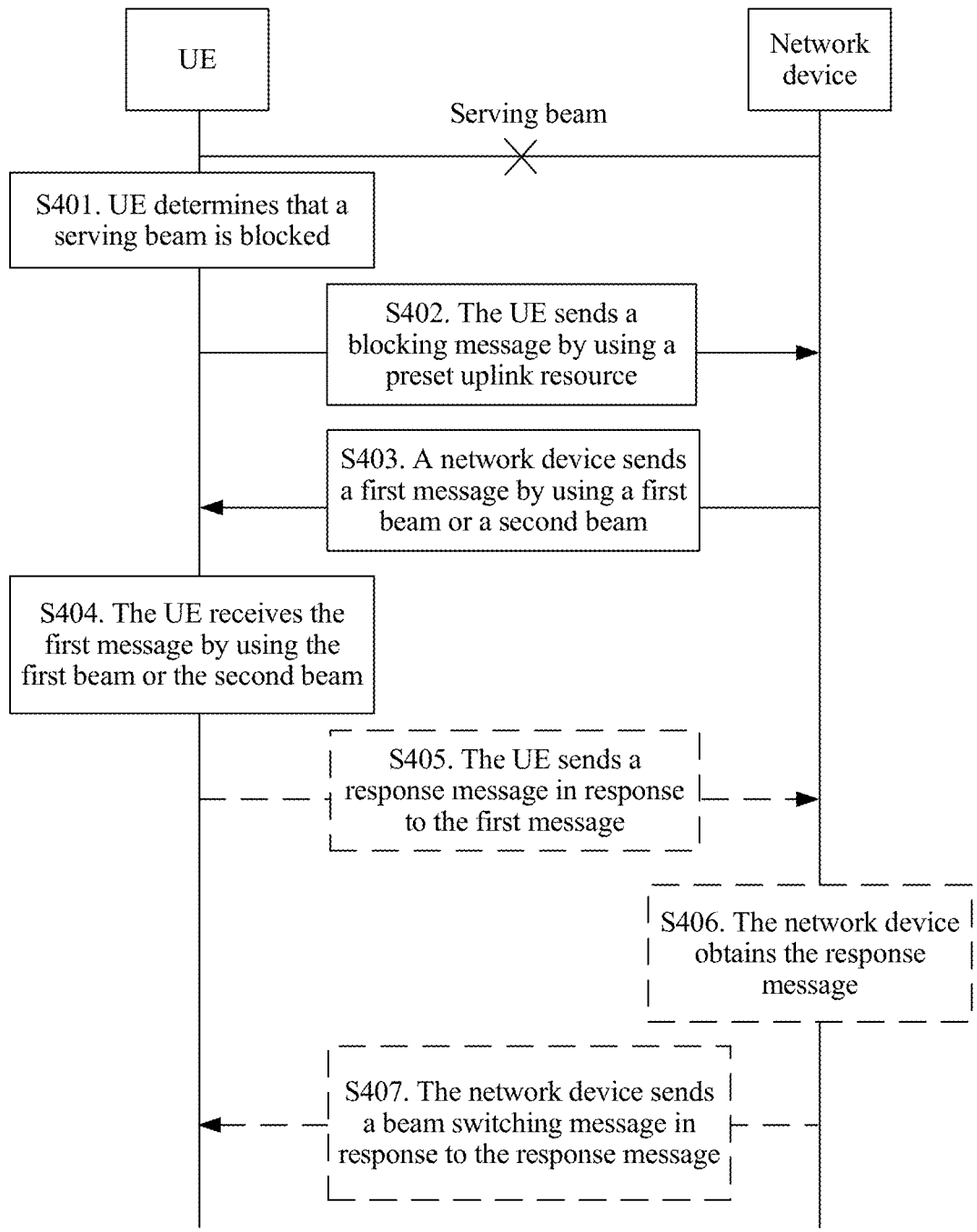
FIG. 4 is a schematic diagram of signaling of a communication method according to another embodiment of the present disclosure.

FIG. 4 is a schematic diagram of signaling of a communication method according to an example embodiment of the present disclosure. In this embodiment, UE can feed back, to a base station by using an uplink resource, a case in which a serving beam is blocked.

S401. The UE determines that a serving beam is blocked.

S402. The UE sends a blocking message by using a preset uplink resource.

The blocking message is used to instruct the network device to send the first message in response to the blocking message.

S403. A network device sends a first message by using the first beam or a second beam.

After receiving the blocking message that is sent by the UE by using the preset uplink resource, the network device may determine that the serving beam of the UE is blocked. In this case, the network device does not know whether there is still an available beam between the network device and the UE. Therefore, the network device sends the first message by using the first beam or the second beam, to attempt to communicate with the UE, thereby finding the available beam.

S404. The UE receives the first message by using the first beam or the second beam.

In this embodiment of the present disclosure, the UE may enable a beam search function after detecting that the serving beam is blocked, or may enable a beam search function after sending the blocking message on the preset uploading resource.

At this point, the UE may determine that the serving beam is blocked, notify the network device of the case in which the serving beam is blocked, and further obtain the first message sent by the network device, thereby eliminating an adverse effect caused by the blocking of the serving beam. Correspondingly, after receiving the blocking message sent by the UE, the network device may send the first message to the UE, thereby eliminating an adverse effect caused by the blocking of the serving beam.

Further, in the communication method provided in this embodiment of the present disclosure, one or a combination of the following steps may further be used based on the foregoing steps.

S405. The UE sends a response message in response to the first message.

S406. The network device obtains the response message.

S407. The network device sends a beam switching message in response to the response message.

In the method provided in this embodiment of the present disclosure, a next serving beam may be determined through information exchange, so that the UE is handed over from a previous serving beam to the next serving beam, and recovers communication with the network device.

A difference between this embodiment of the present disclosure and the embodiment shown in FIG. 3 is that, in this embodiment, a manner in which the network device learns that the serving beam of the UE is blocked is not that the network device detects whether feedback information of the UE is received after sending information to the UE but that the network device directly receives the blocking message sent by using the preset uplink resource. Therefore, in this embodiment of the present disclosure, for a same step, refer to a corresponding description in the embodiment shown in FIG. 3. Details are not described herein again.

Figure 5:
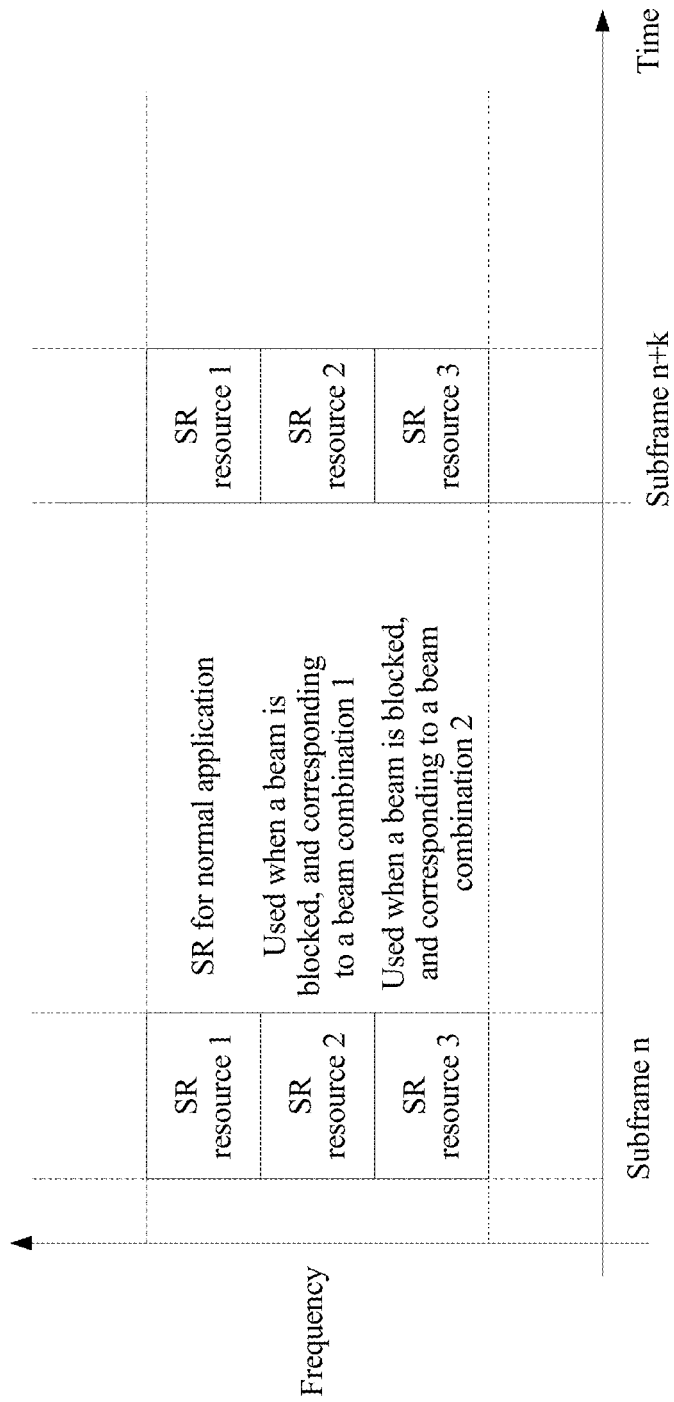
FIG. 5 is a schematic diagram of SR resource allocation according to an embodiment of the present disclosure.

In a scenario, the preset uplink resource may be a dedicated uplink scheduling request (SR) resource. The SR resource is a periodically configured resource indicated by two parameters, where sr-ConfigIndex specifies a period of the SR and a subframe offset of the SR in the period, to be specific, determines a time location of the SR resource; and sr-PUCCH-ResourceIndex specifies an SR resource index number at a single moment, and the SR resource index number is used to correspond to a specific SR resource frequency domain location and a code resource. Optionally, a plurality of SR resources are allocated to single UE in one period of the SR, to be specific, one sr-ConfigIndex matches a plurality of sr-PUCCH-ResourceIndex. A mapping mode is shown in FIG. 5, and an example of the plurality of SR resources in a same SR period of and with a same offset is shown in the figure.

Figure 6:
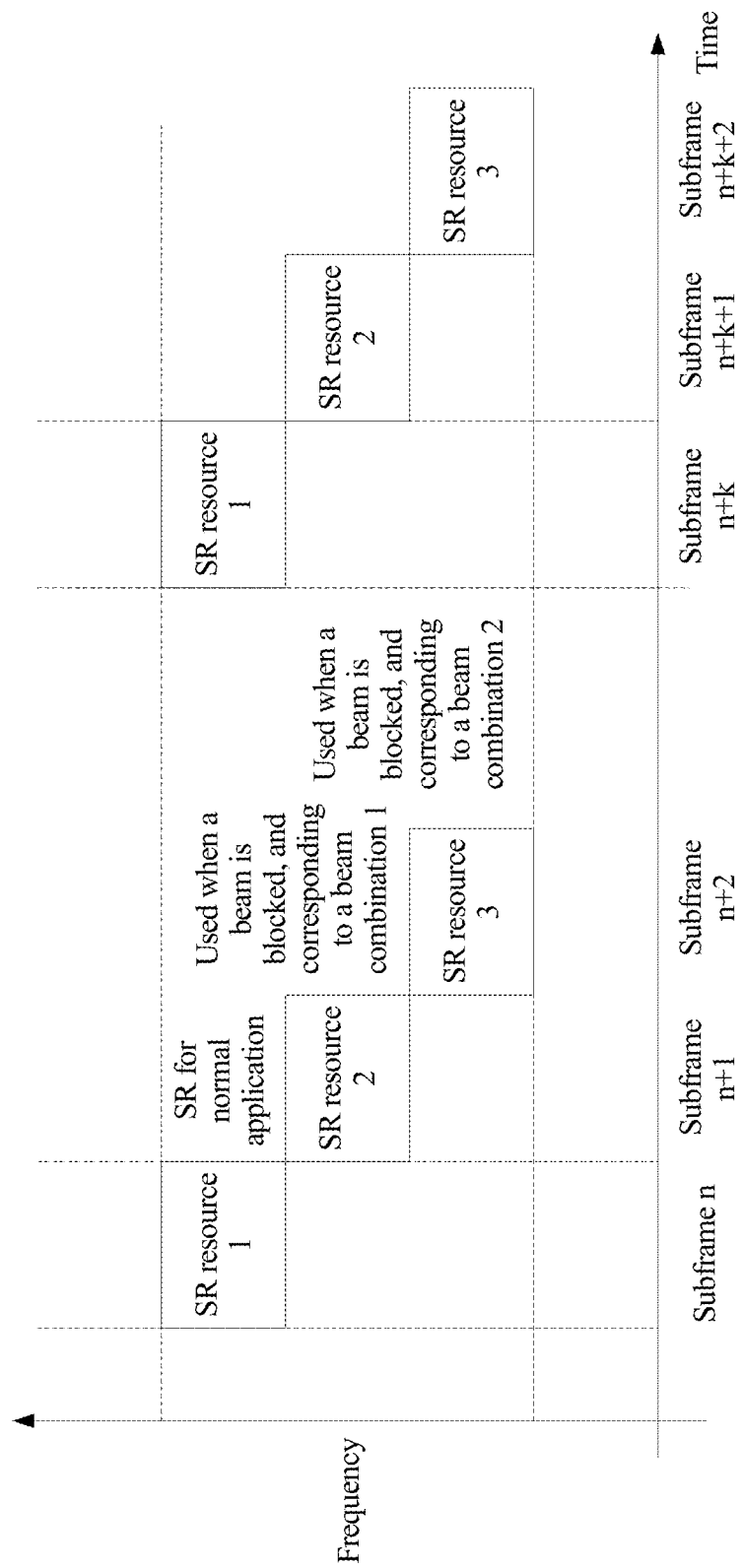
FIG. 6 is a schematic diagram of SR resource allocation according to another embodiment of the present disclosure.

In another scenario, alternatively, a plurality of sr-ConfigIndex may be allocated to single UE, and match one or more sr-PUCCH-ResourceIndex, and a plurality of SR resources are separated on different time-frequency resources. A mapping mode is shown in FIG. 6, and an example of the plurality of SR resources in different SR periods and with different offsets is shown in the figure.

An example is used for description in the following.

If two SR resources are allocated to the UE, one is an uplink resource used for normal application, after receiving data sent on the SR, the base station delivers uplink scheduling to the UE by using a current serving beam; and the other is used to indicate that the current serving beam of the UE is blocked. After receiving data sent on the other SR, the base station delivers uplink scheduling to the UE by using step S404 in the embodiment shown in FIG. 4.

In addition, more than two SR resources may be further allocated to the UE, one is an uplink resource used for normal application, other SRs are used to indicate that the current serving beam of the UE is blocked, and each SR corresponds to different beams or beam combinations. After receiving data sent on the other SRs, the base station learns that the current serving beam is blocked, and also learns that a current optimal beam is which beam or in which beam combination (a classification rule of the beam combination is notified by the base station to the UE in advance or specified in a protocol).

In another scenario, the preset uplink resource may be an uplink reference signal resource. The network device allocates a dedicated uplink reference signal resource to the UE, including but not limited to a demodulation reference signal (DMRS) or a sounding reference signal (SRS). When the UE sends a corresponding reference signal, the base station may know that the current serving beam is blocked, and deliver indication information to the UE by using step S404 in the embodiment shown in FIG. 4, and the indication information may be an uplink scheduling indication or a PDCCH order that triggers random access.

In the foregoing embodiment, after the serving beam of the UE is blocked, communication between the UE and the network device are recovered as soon as possible by searching for and switching to a next serving beam. However, when the serving beam is blocked, the UE starts searching for another beam to detect information that may be sent by the base station, or sends the blocking message to the base station on an available uplink resource at the same time, but finally needs to receive the serving beam switching message of the base station, and needs to be handed over from the serving beam to another available beam, to recover from beam blocking. If the serving beam switching instruction sent by the base station is never obtained, and signal quality of the current serving beam is always lower than a particular threshold, communication of the UE is severely affected, greatly reducing communication quality of the UE.

Figure 7:
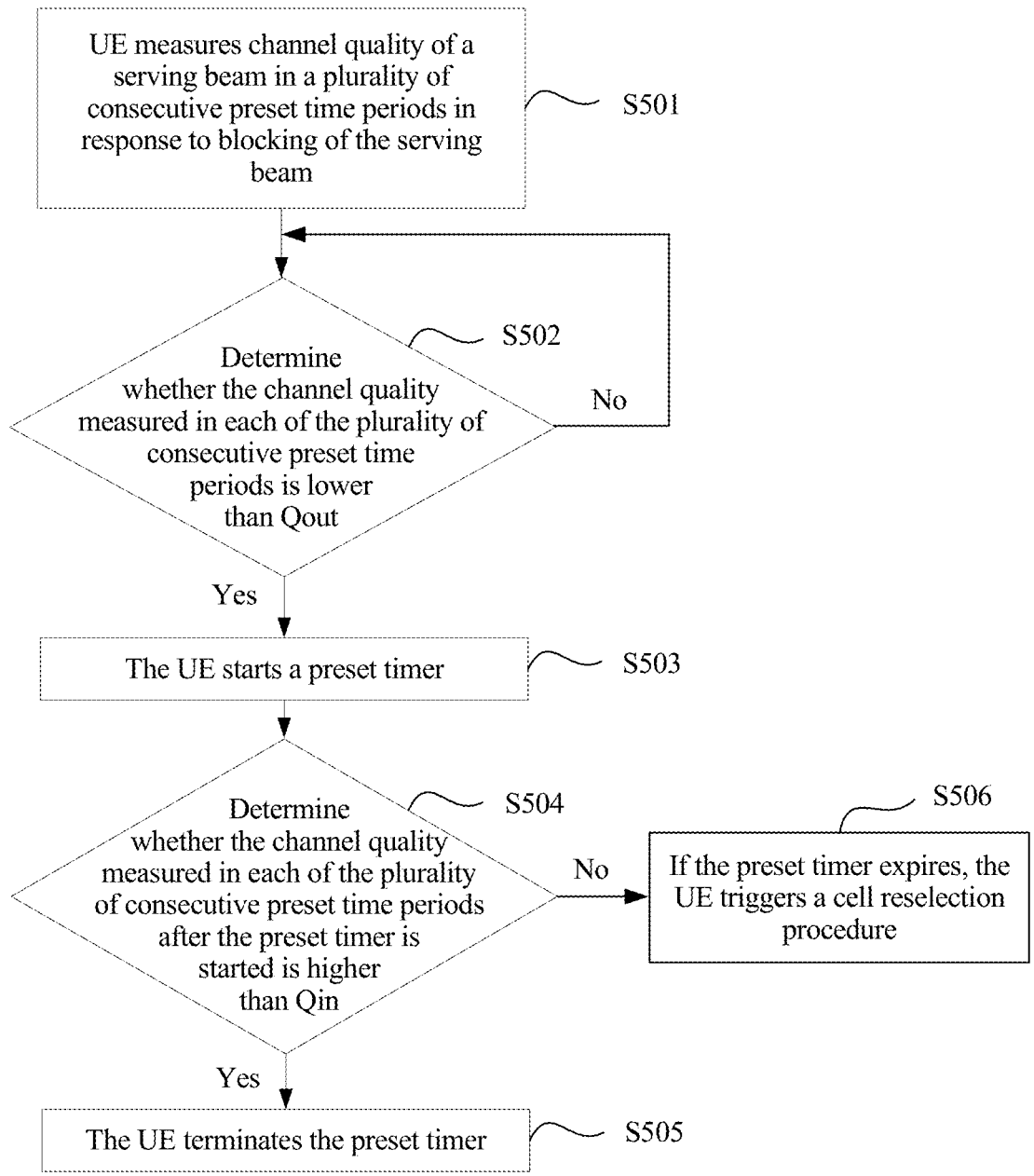
FIG. 7 is a schematic flowchart of a communication method according to an embodiment of the present disclosure.

Optionally, after the serving beam of the UE is blocked, in an embodiment of the present disclosure, in the communication method, one or a combination of the following steps may further be used based on the embodiments shown in FIG. 3 and FIG. 4, as shown in FIG. 7.

S501. The UE measures channel quality of the serving beam in a plurality of consecutive preset time periods in response to the blocking of the serving beam.

In this embodiment of the present disclosure, only the channel quality of the serving beam of the UE may be measured. In another embodiment, channel quality of two or more beams may be further measured. For details, refer to a description in the other embodiment.

S502. The UE separately compares a channel quality value in each time period with Qout, and determines whether the channel quality measured in each of the plurality of consecutive preset time periods is lower than Qout.

If the channel quality measured in each of the plurality of consecutive preset time periods is lower than Qout, step S503 is performed. If the channel quality measured in each of the plurality of consecutive preset time periods is not lower than Qout, go back to step S502 for continuing to make a comparison.

In this embodiment of the present disclosure, a preset reliability threshold is represented by Qin, a preset unreliability threshold is represented by Qout, and Qout is not a determining criterion used when the serving beam is blocked. In addition, the preset reliability threshold is greater than the preset unreliability threshold.

For measuring only the channel quality of the serving beam, during the comparison in step S502, the channel instruction of the serving beam may be directly compared with Qin and Qout.

S503. The UE starts a preset timer.

S504. The UE separately compares the channel quality value in each time period with Qin, and determines whether the channel quality measured in each of the plurality of consecutive preset time periods after the preset timer is started is higher than Qin.

After the preset timer is started, if the channel quality measured in each of the plurality of consecutive preset time periods after the preset timer is started is higher than Qin, step S505 is performed.

5505. The UE terminates the preset timer.

5506. If the channel quality measured in all of the plurality of consecutive preset time periods after the preset timer is started is not higher than Qin, and the preset timer expires, the UE triggers a cell reselection procedure.

In this embodiment of the present disclosure, if the preset timer expires, it indicates that an RLF occurs, to be specific, no available beam exists in a current cell. Therefore, cell reselection needs to be performed, so that the UE may communicate by using a beam in another cell.

In the method provided in this embodiment of the present disclosure, after the serving beam of the UE is blocked, if the UE does not receive the serving beam switching instruction for a long time, and the quality of the serving beam is always lower than a preset threshold, the UE performs a radio link failure (RLF) determining procedure. If the quality of the serving beam becomes better or the serving beam switching instruction of the base station is received in this process, the UE exits from the RLF determining procedure. If the quality of the serving beam does not become better or the serving beam switching instruction of the base station is not received in this process, once it is determined that the RLF occurs, finally, the cell reselection is restarted and a random access procedure is performed.

When measuring the channel quality of the two or more beams, the UE first obtains beam scanning time information, to be specific, time information of occurrence of each related beam. The information may indicate a period in which a beam or a subarray occurs and a time point in a period.

After receiving the time information, for radio link monitoring (RLM)/radio resource management (RRM) measurement of the UE, the UE measures quality of each beam based on a beam occurrence moment specified by the time information. For RRM measurement (RSRP/RSRQ), the UE performs sampling and measurement on each beam only based on the beam occurrence moment specified by the time information, to obtain an RSRP/RSRQ value of each beam. For RLM measurement (RSRP/RSRQ), the UE performs sampling and measurement on each beam only based on the beam occurrence moment specified by the time information, to obtain an RSRP/RSRQ value of each beam.

After measurement results of the plurality of beams are obtained, in a scenario, a process of S501 to S505 is performed for each beam, and the cell reselection procedure is triggered only when preset timers corresponding to all beams expire.

In another scenario, a measurement result of the UE may be first selected from measurement results of all beams based on the measurement results of all the beams. For example, a measurement result of an optimal beam is selected as the measurement result of the UE in each round of measurement, and then the selected measurement result is compared with Qin and Qout in step S502, thereby improving accuracy of triggering the cell reselection procedure.

Figure 8:
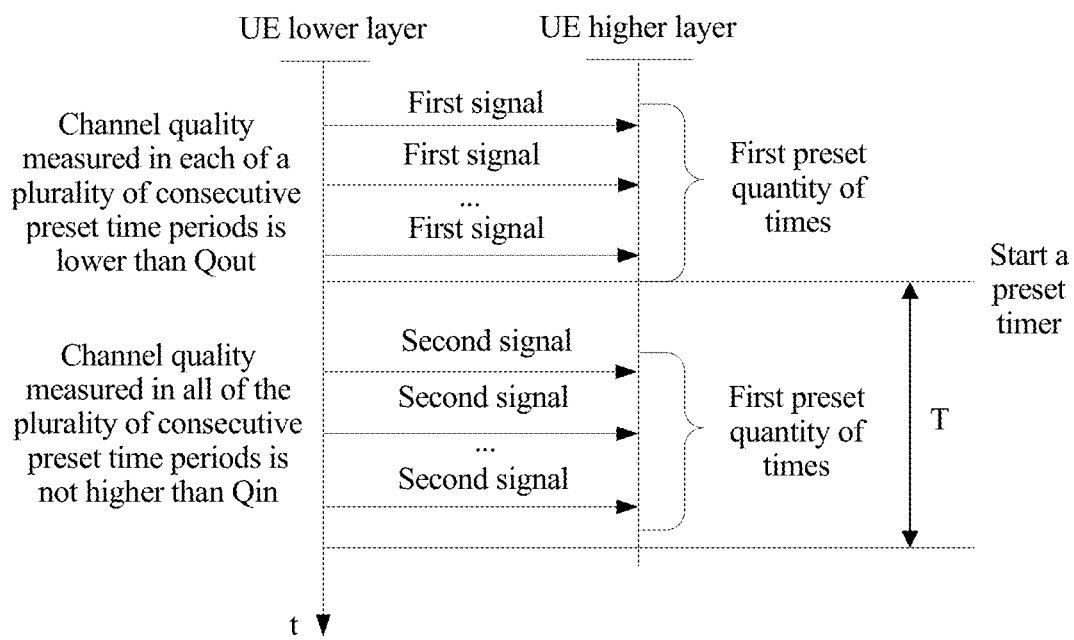
FIG. 8 is a schematic diagram of cell triggering according to an embodiment of the present disclosure.

For ease of description, a measurement result of measuring the serving beam is used as an example for description with reference to a service, as shown in FIG. 8.

In FIG. 8, UE includes a UE lower layer and a UE higher layer, and the UE lower layer measures channel quality of a beam to obtain a measurement result such as an RSRP or RSRQ. In addition, the UE lower layer compares the measurement result with Qin and Qout. When the measurement result is lower than Qout, the UE lower layer generates a first signal such as out of sync, and sends the first signal to the UE higher layer. When the measurement result is higher than Qin, the UE lower layer generates a second signal such as in sync, and sends the second signal to the UE higher layer.

When a quantity of times of continuously sending the first signal by the UE lower layer to the UE higher layer exceeds a first preset quantity of times, it indicates that channel quality measured in a plurality of consecutive preset time periods is lower than the preset unreliability threshold. In this case, the UE higher layer starts a preset timer. After the preset timer is started, if a quantity of times of continuously sending the second signal by the UE lower layer to the UE higher layer exceeds a second preset quantity of times, it indicates that channel quality measured in a plurality of consecutive preset time periods is higher than the preset reliability threshold. In this case, the UE higher layer terminates the preset timer. Timing duration of the preset timer is T.

After the preset timer is started, if a quantity of times of continuously sending the second signal by the UE lower layer to the UE higher layer does not exceed a second preset quantity of times, the preset timer expires. In this case, it may be determined that an RLF occurs, and a cell reselection procedure is triggered.

Figure 9:
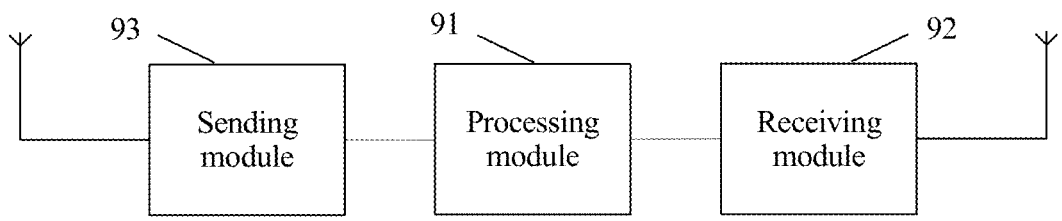
FIG. 9 is a schematic structural diagram of a communications apparatus according to an embodiment of the present disclosure.

An embodiment of the present disclosure further provides a communications apparatus, applied to user equipment, where the user equipment can communicate with the network device by using a plurality of beams, the plurality of beams include a first beam and at least one second beam, the first beam is a serving beam used by the user equipment to listen to control information, and the second beam is a beam other than the serving beam. As shown in FIG. 9, the apparatus includes:

a processing module 91, configured to determine that the serving beam is blocked; and a receiving module 92, configured to obtain a first message from the network device by using the first beam or the second beam.

Figure 10:
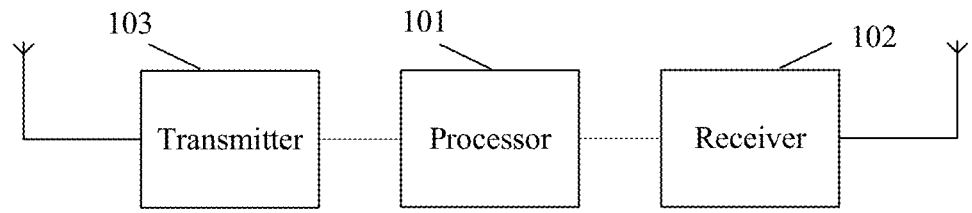
FIG. 10 is a schematic structural diagram of user equipment according to an embodiment of the present disclosure.

FIG. 10 is a schematic structural diagram of an electronic device according to an embodiment of the present disclosure. In the embodiment of the present disclosure, the processing module 91 may be a processor 101 in FIG. 10, and the receiving module 92 may be a receiver 102 in FIG. 10.

Optionally, in an embodiment of the present disclosure, as shown in FIG. 9, the apparatus further includes:

a sending module 93, configured to send a response message in response to the first message, where the response message is used to indicate a beam used by the receiving module to obtain the first message.

In the embodiment of the present disclosure, the sending module 93 may be a transmitter 103 in FIG. 10.

Optionally, in another embodiment of the present disclosure, the receiving module 91 is further configured to obtain a beam switching message that is sent by the network device in response to the response message, where the beam switching message is used to indicate that one of the plurality of beams is a next serving beam of the user equipment.

In still another embodiment of the present disclosure, the sending module 93 is further configured to send a blocking message by using a preset uplink resource, where the blocking message is used to instruct the network device to send the first message in response to the blocking message.

Optionally, in still another embodiment of the present disclosure, the second beam includes a plurality of beams.

Optionally, in still another embodiment of the present disclosure, that the receiving module 92 is configured to obtain a first message from the network device by using the first beam or the second beam is specifically:

the receiving module 92 is configured to receive, on the first beam and each second beam, the first message sent by the network device; or the receiving module 92 is configured to: search for all beams in a preset beam combination, where the preset beam combination includes the first beam, or the first beam and any quantity of second beams; and receive the first message that is sent by the network device by using any one or more beams in the preset beam combination; or the receiving module 92 is configured to: select, at different time points by using a preconfigured correspondence between a beam and a time point, a corresponding single beam from the first beam and all second beams for performing a search; and receive the first message that is sent by the network device by using the selected single beam; or the receiving module 92 is configured to: search for all the beams in the preset beam combination; when the first message is received on none of the beams in the preset beam combination, select, at different time points by using a preconfigured correspondence between a beam and a time point, a corresponding single beam from a beam outside the preset beam combination for performing a search; and receive the first message that is sent by the network device by using the selected single beam.

Optionally, in still another embodiment of the present disclosure, the first message carries one piece or a combination of indication information and data information.

Optionally, in still another embodiment of the present disclosure, the indication information is a PDCCH order.

The processing module 91 is further configured to generate a preamble in response to the PDCCH order.

That the sending module 93 is configured to send a response message in response to the first message is specifically:

the sending module 93 is configured to send the preamble on a preset random access resource in a beam used by the first message; or the sending module 93 is configured to send the preamble on a preset random access resource in all beams used by the first message; or the sending module 93 is configured to: determine a beam with a greatest signal power in all beams used by the first message, and send the preamble on a preset random access resource in the beam with the greatest power; or the sending module 93 is configured to: after sending the preamble on a preset random access resource in a beam on which the first message is received, receive the first message from another beam, and if a signal power of the another beam is greater than a signal power of the previous beam, send the preamble on a preset random access resource in the another beam.

Optionally, in still another embodiment of the present disclosure, the indication information is uplink scheduling indication information.

The processing module 91 is further configured to determine a measurement report that includes communication quality of all beams.

That the sending module 93 is configured to send a response message in response to the first message is specifically:

the sending module 93 is configured to send the measurement report by using a preset time-frequency resource in any beam used by the first message.

Optionally, in still another embodiment of the present disclosure, the processing module 93 is further configured to: measure channel quality of at least one of the plurality of beams in a plurality of consecutive preset time periods in response to the blocking of the serving beam;

separately compare a channel quality value in each time period with a preset reliability threshold and a preset unreliability threshold, where the preset reliability threshold is greater than the preset unreliability threshold; and if channel quality measured in each of the plurality of consecutive preset time periods is lower than the preset unreliability threshold, start a preset timer; or if channel quality measured in each of the plurality of consecutive preset time periods after the preset timer is started is higher than the preset reliability threshold, terminate the preset timer; or if channel quality measured in none of the plurality of consecutive preset time periods after the preset timer is started is higher than the preset reliability threshold, and the preset timer expires, trigger a cell reselection procedure.

Figure 11:
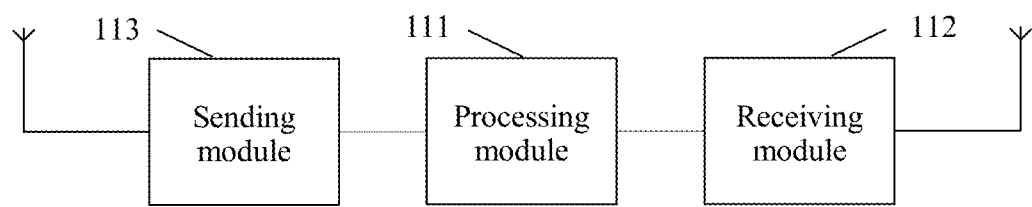
FIG. 11 is a schematic structural diagram of another communications apparatus according to an embodiment of the present disclosure.

An embodiment of the present disclosure further provides a communications apparatus, applied to a network device, where user equipment can communicate with the network device by using a plurality of beams, the plurality of beams include a first beam and at least one second beam, the first beam is a serving beam used by the user equipment to listen to control information, and the second beam is a beam other than the serving beam. As shown in FIG. 11, the apparatus includes:

the processing module 111, configured to determine that the serving beam is blocked; and the sending module 112, configured to send a first message by using the first beam or the second beam.

Figure 12:
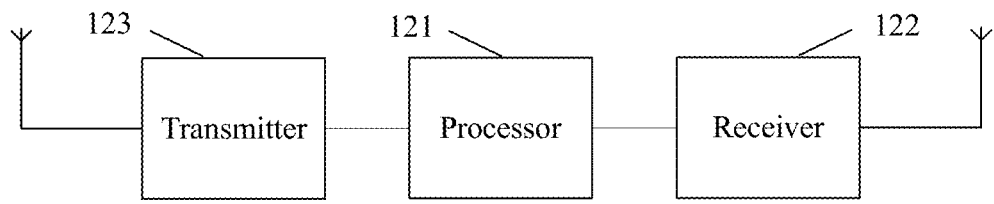
FIG. 12 is a schematic structural diagram of a network device according to an embodiment of the present disclosure.

FIG. 12 is a schematic structural diagram of an electronic device according to an embodiment of the present disclosure. In the embodiment of the present disclosure, the processing module 111 may be a processor 121 in FIG. 12, and the receiving module 112 may be a receiver 122 in FIG. 12.

Optionally, in another embodiment of the present disclosure, as shown in FIG. 11, the apparatus further includes a receiving module 113.

That the processing module 111 is configured to determine that the serving beam is blocked is specifically:

if the receiving module 113 does not receive, within preset duration after the network device sends a second message, a feedback message that is sent by the user equipment in response to the second message, the processing module 111 is configured to determine that the serving beam is blocked; or if the receiving module 113 receives a blocking message that is sent by the user equipment by using the first beam or the second beam, the processing module 111 is configured to determine that the serving beam is blocked.

In the embodiment of the present disclosure, the sending module 113 may be a transmitter 123 in FIG. 12.

Optionally, in still another embodiment of the present disclosure, the receiving module 112 is further configured to obtain a response message that is sent by the user equipment in response to the first message, where the response message is used to indicate a beam used by the user equipment to obtain the first message.

The sending module 113 is further configured to send, by the network device, a beam switching message in response to the response message, where the beam switching message is used to indicate that one of the plurality of beams is a next serving beam of the user equipment.

Optionally, in still another embodiment of the present disclosure, the second beam includes a plurality of beams.

In still another embodiment of the present disclosure, that the sending module 113 is configured to send a first message by using the first beam or the second beam is specifically:

the sending module 113 is configured to send the first message by using the first beam and each second beam; or the sending module 113 is configured to send the first message by using all beams in a preset beam combination, where the preset beam combination includes the first beam, or the first beam and any quantity of second beams; or the sending module 113 is configured to: select a corresponding single beam from the first beam and all second beams at different time points by using a preconfigured correspondence between a beam and a time point; and send the first message by using the selected single beam; or the sending module 113 is configured to: send the first message by using all the beams in the preset beam combination; if the response message that is sent by the user equipment in response to the first message is received on none of the beams in the preset beam combination, select a corresponding single beam from the plurality of beams or a beam outside the preset beam combination at different time points by using a preconfigured correspondence between a beam and a time point; and send the first message by using the selected single beam.

Optionally, in still another embodiment of the present disclosure, the first message carries one piece or a combination of indication information and data information.

In still another embodiment of the present disclosure, the indication information is a PDCCH order.

That the receiving module 112 is configured to obtain a response message that is sent by the user equipment in response to the first message is specifically:

the receiving module 112 is configured to receive a preamble that is sent by the user equipment by using one or more beams.

Optionally, in still another embodiment of the present disclosure, the processing module 111 is further configured to: if the preamble is received by using one beam, determine, as a next serving beam, the beam used by the preamble; or if the preamble is received by using at least two beams, determine a beam with a greatest signal power in the at least two beams as a next serving beam; or if the preamble is received by using at least two beams, determine, as a next serving beam, a beam used by a last received preamble.

That the sending module 113 is configured to send a beam switching message in response to the response message is specifically:

the sending module 113 is configured to send identification information of the next serving beam in response to the response message.

Optionally, in still another embodiment of the present disclosure, the indication information is uplink scheduling indication information.

That the receiving module 112 is configured to obtain a response message that is sent by the user equipment in response to the first message is specifically:

the receiving module 112 is configured to receive a measurement report that is of all of the plurality of beams and that is sent by using one beam.

Optionally, in still another embodiment of the present disclosure, the processing module 111 is further configured to determine, as a next serving beam, a beam with a greatest signal power in all of the plurality of beams in response to the measurement report.

That the sending module 113 is configured to send a beam switching message in response to the response message is specifically:

the sending module 113 is configured to send identification information of the next serving beam in response to the response message.

An embodiment of the present disclosure further provides a communications system, and the communications system may include the user equipment shown in FIG. 10 and the network device shown in FIG. 12.

The described apparatus embodiments are merely examples. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments.

Based on the foregoing descriptions of the embodiments, a person skilled in the art may clearly understand that the embodiments may be implemented by software in addition to a universal hardware platform or by hardware only. Based on such an understanding, the technical solutions essentially or the part contributing to the related art may be implemented in a form of a software product. The computer software product may be stored in a computer-readable storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments.

A person skilled in the art can easily figure out another implementation solution of the present disclosure after considering the specification and practicing the present disclosure disclosed herein. This application is intended to cover any variations, functions, or adaptive changes of the present disclosure. These variations, functions, or adaptive changes comply with general principles of the present disclosure, and include common knowledge or a commonly used technical means in the technical field that is not disclosed in the present disclosure. The specification and the embodiments are merely considered as examples, and the actual scope and the spirit of the present disclosure are pointed out by the appended claims.

It should be understood that the present disclosure is not limited to the accurate structures that are described in the foregoing and that are shown in the accompanying drawings, and modifications and changes may be made without departing from the scope of the present disclosure. The scope of the present disclosure is limited only by the appended claims.

What is claimed is:

1. A communication method, wherein user equipment is configured to communicate with a network device by using a plurality of beams, wherein the plurality of beams comprise a first beam and at least one second beam, the first beam is a serving beam for use by the user equipment to listen to control information, and the second beam is a beam other than the serving beam, the method comprising:

determining, by the user equipment, that the serving beam is blocked;

obtaining, by the user equipment, a first message from the network device by using the first beam or the second beam;

sending, by the user equipment, a response message in response to the first message for indicating a beam used by the user equipment to obtain the first message; and obtaining, by the user equipment, a beam switching message sent by the network device in response to the response message, wherein the beam switching message indicates that one of the plurality of beams is a next serving beam of the user equipment.

2. The method according to claim 1, further comprising:
sending, by the user equipment, a blocking message by using a preset uplink resource for instructing the network device to send the first message in response to the blocking message.

3. The method according to claim 1, wherein the second beam comprises a plurality of beams.

4. The method according to claim 3, wherein obtaining, by the user equipment, a first message from the network device by using the first beam or the second beam comprises:

receiving, by the user equipment on the first beam and each second beam, the first message sent by the network device; or searching, by the user equipment, for all beams in a preset beam combination, wherein the preset beam combination comprises: the first beam, or the first beam and any quantity of second beams, and receiving the first message sent by the network device by using any one or more beams in the preset beam combination; or selecting, by the user equipment at different time points by using a preconfigured correspondence between a beam and a time point, a corresponding single beam from the first beam and all second beams for performing a search, and receiving the first message sent by the network device by using the selected single beam; or searching, by the user equipment, for all the beams in the preset beam combination, when the first message is received on none of the beams in the preset beam combination, selecting, at different time points by using a preconfigured correspondence between a beam and a time point, a corresponding single beam from the plurality of beams or a beam outside the preset beam combination for performing a search, and receiving the first message that is sent by the network device by using the selected single beam.

5. The method according to claim 1, wherein the first message comprises one piece or a combination of indication information and data information.

6. The method according to claim 5, wherein:
the indication information is a physical downlink control channel (PDCCH) order;
the method further comprises:
in response to the PDCCH order, generating, by the user equipment, a preamble; and
sending, by the user equipment, a response message in response to the first message comprises:
sending, by the user equipment, the preamble on a preset random access resource in a beam used by the first message, or
sending, by the user equipment, the preamble on a preset random access resource in all beams used by the first message, or
determining, by the user equipment, a beam with a greatest communication quality value in all beams used by the first message, and sending the preamble on a preset random access resource in the determined beam, or
after sending the preamble on a preset random access resource in a beam on which the first message is received, receiving, by the user equipment, the first message from another beam, and when a communication quality value of the another beam is greater than a communication quality value of the previous beam, sending the preamble on a preset random access resource in the another beam.

7. The method according to claim 5, wherein:
the indication information is uplink scheduling indication information;
the method further comprises:
determining, by the user equipment, a measurement report that comprises communication quality of all beams; and
sending, by the user equipment, a response message in response to the first message comprises:
sending, by the user equipment, the measurement report by using a preset time-frequency resource in any beam used by the first message.

8. The method according to claim 1, further comprising:
measuring, by the user equipment, channel quality of at least one of the plurality of beams in a plurality of consecutive preset time periods in response to the blocking of the serving beam;
separately comparing, by the user equipment, a channel quality value in each time period with a preset reliability threshold and a preset unreliability threshold, wherein the preset reliability threshold is greater than the preset unreliability threshold; and
when the channel quality measured in each of the plurality of consecutive preset time periods is lower than the preset unreliability threshold, starting, by the user equipment, a preset timer; or when the channel quality measured in each of the plurality of consecutive preset time periods after the preset timer is started is higher than the preset reliability threshold, terminating, by the user equipment, the preset timer; or when the channel quality measured in each of the plurality of consecutive preset time periods after the preset timer is started is higher than the preset reliability threshold, and the preset timer expires, triggering, by the user equipment, a cell reselection procedure.

9. User equipment configured to communicate with a network device by using a plurality of beams, wherein the plurality of beams comprise a first beam and at least one second beam, the first beam is a serving beam used by the user equipment to listen to control information, and the second beam is a beam other than the serving beam, the user equipment comprising:
 a processor configured to determine that the serving beam is blocked;
 a receiver configured to obtain a first message from the network device by using the first beam or the second beam; and
 a transmitter configured to send a response message in response to the first message for indicating a beam used by the receiver to obtain the first message; and, wherein the receiver is further configured to:
 obtain a beam switching message that is sent by the network device in response to the response message, wherein the beam switching message indicates that one of the plurality of beams is a next serving beam of the user equipment.

10. The user equipment according to claim 9, wherein the transmitter is further configured to:
 send a blocking message by using a preset uplink resource for instructing the network device to send the first message in response to the blocking message.

11. The user equipment according to claim 9, wherein the second beam comprises a plurality of beams.

12. The user equipment according to claim 11, wherein to obtain a first message from the network device by using the first beam or the second beam, the receiver is configured to:
 receive, on the first beam and each second beam, the first message sent by the network device; or
 search for all beams in a preset beam combination, wherein the preset beam combination comprises the first beam, or the first beam and any quantity of second beams, and receive the first message that is sent by the network device by using any one or more beams in the preset beam combination; or
 select, at different time points by using a preconfigured correspondence between a beam and a time point, a corresponding single beam from the first beam and all second beams for performing a search, and receive the first message that is sent by the network device by using the selected single beam; or
 search for all the beams in the preset beam combination, and when the first message is received on none of the beams in the preset beam combination, select, at different time points by using a preconfigured correspondence between a beam and a time point, a corresponding single beam from a beam outside the preset beam combination for performing a search, and receive the first message that is sent by the network device by using the selected single beam.

13. The user equipment according to claim 9, wherein the first message comprises one piece or a combination of indication information and data information.

14. The user equipment according to claim 13, wherein:
 the indication information is a physical downlink control channel (PDCCH) order;
 the processor is further configured to generate a preamble in response to the PDCCH order; and
 to send a response message in response to the first message, the transmitter is configured to:
 send the preamble on a preset random access resource in a beam used by the first message, or
 send the preamble on a preset random access resource in all beams used by the first message, or
 determine a beam with a greatest signal power in all beams used by the first message, and send the preamble on a preset random access resource in the beam with the greatest power, or
 after sending the preamble on a preset random access resource in a beam on which the first message is received, receive the first message from another beam, and when a signal power of the another beam is greater than a signal power of the previous beam, send the preamble on a preset random access resource in the another beam.

15. The apparatus according to claim 13, wherein:
 the indication information is uplink scheduling indication information;
 the processor is further configured to determine a measurement report that comprises communication quality of all beams; and
 to send a response message in response to the first message, the transmitter is configured to:
 send the measurement report by using a preset time-frequency resource in any beam used by the first message.

16. A system for use in a communications network, the system comprising:
 user equipment configured to communicate within the communications network by using a plurality of beams, wherein the plurality of beams comprise a first beam and at least one second beam, the first beam is a serving beam used by the user equipment to listen to control information, the second beam is a beam other than the serving beam, and the user equipment comprises:
 a processor configured to determine that the serving beam is blocked, and
 a receiver configured to obtain a first message by using the first beam or the second beam; and
 a network device, comprising,
 a processor configured to determine that the serving beam is blocked, and
 a transmitter configured to send the first message to the user equipment by using the first beam or the second beam; and, wherein the User Equipment is further configured to:
 send a response message in response to the first message for indicating a beam used by the user equipment to obtain the first message; and
 obtain a beam switching message sent by the network device in response to the response message, wherein the beam switching message indicates that one of the plurality of beams is a next serving beam of the user equipment.

* * * * *